Oct. 27, 1964   J. L. LA POINTE   3,154,135
D.C. IGNITER SYSTEM
Filed Oct. 26, 1961
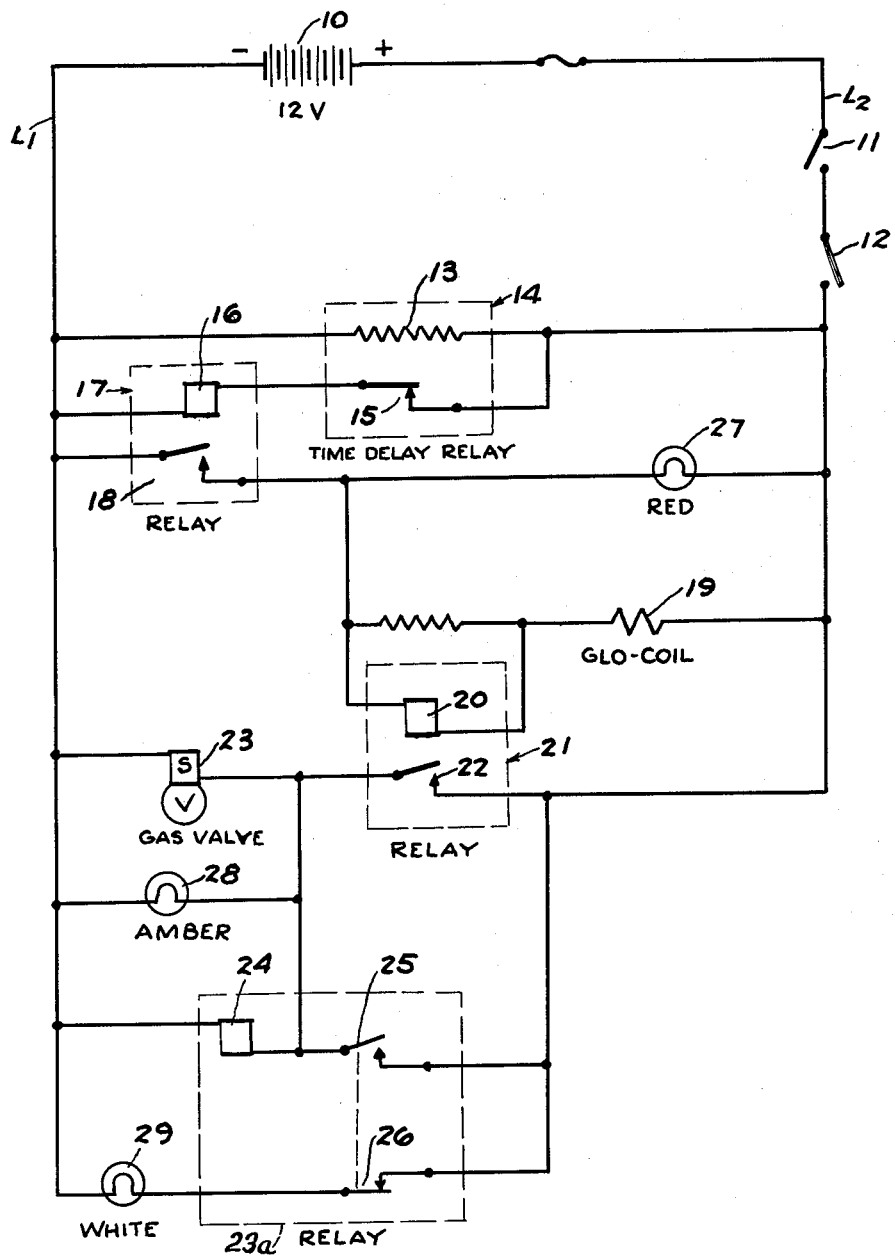
INVENTOR.
JOSEPH LEO LaPOINTE
BY
Barnes, Kisselle, Raisch & Choate
ATTORNEYS "# United States Patent Office 3,154,135
Patented Oct. 27, 1964

3,154,135
D.C. IGNITER SYSTEM
Joseph Leo La Pointe, Detroit, Mich., assignor, by mesne assignments, to General Precision, Inc., Tarrytown, N.Y., a corporation of Delaware
Filed Oct. 26, 1961, Ser. No. 147,817
3 Claims. (Cl. 158—122)

This invention relates to igniter systems and particularly to igniters for gaseous burners.

It is an object of this invention to provide a direct current igniter system which is particularly applicable for use with portable devices incorporating gas burners such as tar kettles.

It is a further object of the invention to provide such an igniter system which will fail safe and will adequately signal whenever a malfunction occurs.

In the drawings, the single figure shows the wiring diagram of an igniter system embodying the invention.

As shown in the drawing, the igniter system comprises a source of D.C. current such as a battery 10 which supplies power to lines $L_1$, $L_2$. A master switch 11 is provided in line $L_2$. A thermostatically operated switch 12, such as a bimetallic switch is also provided in line $L_2$. Bimetallic switch 12 is adapted to be positioned adjacent or at an appropriate position on the device utilizing the gas burner so that when the temperature drops below a predetermined value, thermostatic switch 12 will close and when the temperature rises to the desired value, thermostatic switch 12 will open.

Upon closing of the thermostatic switch 12 current is supplied to the resistance 13 of a time delay unit 14 and to the bimetallic switch 15 of time delay unit 14. Resistance 13 is connected in series to lines $L_1$, $L_2$. Bimetallic switch 15 is connected in series with lines $L_1$, $L_2$ and the coil 16 of a monitoring relay 17. At the same time as current flows through resistance 13, current also flows through closed bimetallic switch 15 and through coil 16. Energization of coil 16 of relay 17 will close normally open switch 18 of relay 17 completing the circuit through a glow coil 19 which is also connected in series with lines $L_1$, $L_2$ and switch 18 but in parallel with resistance 13 of time delay unit 14.

When the glow coil 19 is energized, the coil 20 of relay 21 which is connected in series with glow coil 19 will also be energized. This will actuate the normally open switch 22 of relay 21 which is connected in series with gas solenoid 23 of a gas valve. Switch 22 and gas solenoid 23 are, in turn, connected in parallel to the glow coil 19. Energization of the gas solenoid will actuate the gas valve supplying gaseous fuel to the burner.

After a predetermined period of time, the continued passage of current through resistor 13 of time delay unit 14 will cause heating of the resistance 13 sufficient to actuate the bimetallic switch 15 thereby de-energizing the coil 16 of relay 17. This will open switch 18 and de-energize the glow coil 19. This, in turn, will de-energize coil 20 of relay 21 and open switch 22 of relay 21.

However, gas solenoid 23 will not be de-energized because of the presence of a holding relay 23a consisting of a coil 24 in parallel with gas solenoid 23 and in series with switch 22. Coil 24 of the holding relay is energized at the same time as gas solenoid 23 and operates normally open switch 25 which is in parallel with switch 22 and normally closed switch 26. Thus, even though switch 22 opens when the glow coil is de-energized, the gas solenoid 23 is energized through the action of the holding relay and specifically through switch 25.

Monitoring lights are provided in order to signal any malfunctions in the system. Thus, a red light 27 is provided in parallel with glow coil 19. Red light 27 will be energized whenever glow coil 19 is energized. An amber light 28 is provided in parallel with gas solenoid 23 and is energized whenever gas solenoid 23 is energized. A white light 29 is provided in series with normally closed switch 26 and is energized whenever thermostat 12 is closed to demand heat by either glow coil 19 or gas solenoid 23.

The monitoring relay 17 functions to prevent energization of the glow coil 19 whenever the voltage of the battery 10 is so low that the relay 17 cannot be energized. This prevents malfunction of the igniter system as might occur if there were no monitoring the strength of the battery.

I claim:
1. An igniter system for gas burners comprising: a first conductor and a second conductor, a source of D.C. power and a thermostatically controlled switch connected in series between said first conductor and said second conductor, a time delay relay connected between said first and second conductors, said time delay relay having normally closed contacts and operating to open said contacts a predetermined time interval after being energized, a second relay connected in series with the normally closed contacts of said time delay relay between said first and second conductors, said second relay having normally open contacts and operating to close said contacts when energized, a glow coil for igniting burner gas and a third relay connected in series with the normally open contacts of said second relay between said first and second conductors, said third relay having normally open contacts and operating to close said contacts when energized, a valve operable to control a flow of burner gas to said glow coil, a solenoid operable when energized to open said valve and connected in series with the normally open contacts of said third relay between said first and second conductors, a fourth relay connected in parallel with said solenoid and having normally open contacts connected in parallel with the normally open contacts of said third relay, said fourth relay operating to close its normally open contacts when energized.

2. An igniter system as recited in claim 1 wherein a first indicator lamp is connected in parallel with said glow coil and a second lamp is connected in parallel with said solenoid.

3. An igniter system as recited in claim 2 wherein said fourth relay has a set of normally closed contacts and there is provided an indicator lamp connected in series with the normally closed contacts of said fourth relay between said first and second conductors.

References Cited in the file of this patent
UNITED STATES PATENTS

| | | |
|---|---|---|
| 2,188,565 | Bower | Jan. 30, 1940 |
| 2,212,255 | Wallis et al. | Aug. 20, 1940 |
| 2,406,925 | Strobel | Sept. 3, 1946 |
| 2,484,602 | Aubert | Oct. 11, 1949 |
| 2,596,729 | See | May 13, 1952 |
| 2,606,544 | Church et al. | Aug. 12, 1952 |
| 2,772,727 | Schell | Dec. 4, 1956 |